United States Patent
Li et al.

(10) Patent No.: US 11,830,479 B2
(45) Date of Patent: Nov. 28, 2023

(54) VOICE RECOGNITION METHOD AND APPARATUS, AND AIR CONDITIONER

(71) Applicant: GREE ELECTRIC APPLIANCES, INC. OF ZHUHAI, Zhuhai (CN)

(72) Inventors: Mingjie Li, Zhuhai (CN); Dechao Song, Zhuhai (CN); Jutao Jia, Zhuhai (CN); Wei Wu, Zhuhai (CN); Junjie Xie, Zhuhai (CN)

(73) Assignee: GREE ELECTRIC APPLIANCES, INC. OF ZHUHAI, Zhuhai (CN)

( * ) Notice: Subject to any disclaimer, the term of this patent is extended or adjusted under 35 U.S.C. 154(b) by 216 days.

(21) Appl. No.: 17/407,443

(22) Filed: Aug. 20, 2021

(65) Prior Publication Data

US 2021/0383795 A1    Dec. 9, 2021

Related U.S. Application Data

(63) Continuation of application No. PCT/CN2019/110107, filed on Oct. 9, 2019.

(30) Foreign Application Priority Data

Feb. 21, 2019 (CN) .......................... 201910130206.9

(51) Int. Cl.
*G10L 15/08* (2006.01)
*F24F 11/56* (2018.01)
(Continued)

(52) U.S. Cl.
CPC .............. *G10L 15/08* (2013.01); *F24F 11/56* (2018.01); *G06N 3/08* (2013.01); *G10L 21/02* (2013.01);
(Continued)

(58) Field of Classification Search
CPC .... G10L 21/02; G10L 25/30; G10L 2015/088
(Continued)

(56) References Cited

U.S. PATENT DOCUMENTS

| 6,122,613 A | 9/2000 | Baker |
| 8,892,443 B2 | 11/2014 | Bocchieri et al. |

(Continued)

FOREIGN PATENT DOCUMENTS

| CN | 103095911 A | 5/2013 |
| CN | 104756526 A | 7/2015 |

(Continued)

OTHER PUBLICATIONS

P. Gavaskar, E. Maass, L. Weldy and H. Nguyen, "Integrating voice recognition technology with inspection of integrated circuits," IEEE/SEMI International Symposium on Semiconductor Manufacturing Science, Burlingame, CA, USA, 1990, pp. 123-130, doi: 10.1109/ISMSS.1990.66130. (Year: 1990).*

(Continued)

*Primary Examiner* — Bharatkumar S Shah
(74) *Attorney, Agent, or Firm* — Westbridge IP LLC

(57) ABSTRACT

Provided is a voice recognition method and a voice recognition apparatus, and an air conditioner. The method includes: acquiring first voice data; adjusting, according to the first voice data, a collection state of second voice data to obtain an adjusted collection state, and acquiring the second voice data based on the adjusted collection state; and performing far-field voice recognition on the second voice data using a preset far-field voice recognition model so as to obtain semantic information corresponding to the acquired second voice data. The application can solve the problem in which far-field voice recognition performance is poor when a deep learning method or a microphone array method is used to remove reverberation and noise from far-field voice data, thereby enhancing far-field voice recognition performance.

16 Claims, 5 Drawing Sheets

(51) Int. Cl.
*G06N 3/08* (2023.01)
*G10L 21/02* (2013.01)
*G10L 25/30* (2013.01)

(52) U.S. Cl.
CPC ........ *G10L 25/30* (2013.01); *G10L 2015/088* (2013.01)

(58) Field of Classification Search
USPC ........................................................ 704/200
See application file for complete search history.

(56) References Cited

U.S. PATENT DOCUMENTS

| | | | |
|---|---|---|---|
| 2004/0003070 A1* | 1/2004 | Fernald | H04L 43/00 709/223 |
| 2014/0372129 A1 | 12/2014 | Tzirkel-Hancock et al. | |
| 2018/0233145 A1 | 8/2018 | Bathiche et al. | |
| 2019/0103110 A1* | 4/2019 | Kawano | G10L 15/22 |
| 2019/0214002 A1* | 7/2019 | Park | G10L 15/30 |
| 2021/0040668 A1* | 2/2021 | Cha | D06F 34/08 |

FOREIGN PATENT DOCUMENTS

| | | |
|---|---|---|
| CN | 105825855 A | 8/2016 |
| CN | 107464564 A | 12/2017 |
| CN | 107862060 A | 3/2018 |
| CN | 108538305 A | 9/2018 |
| CN | 109074816 A | 12/2018 |
| CN | 109119071 A | 1/2019 |
| CN | 109215656 A | 1/2019 |
| CN | 109360579 A | 2/2019 |
| CN | 109767769 A | 5/2019 |
| WO | 2018022222 A1 | 2/2018 |

OTHER PUBLICATIONS

P, Gavaskar, E. Maass, L. Weldy and H. Nguyen, "Integrating voice recognition technology with inspection of integrated circuits," IEEE/SEMI International Symposium on Semiconductor Manufacturing Science, Burlingame, CA, USA, 1990, pp. 123-130, doi: 10.1109/ISMSS.1990.66130. (Year: 1990) (Year: 1990).*
Extended European Search Report issued in counterpart European Patent Application No. 19915991.4 dated Jun. 13, 2022.
First Office Action issued in counterpart Chinese Patent Application No. 201910130206.9, dated May 28, 2020.
International Search Report issued in corresponding PCT Application No. PCT/CN2019/110107, dated Dec. 27, 2019.
Written Opinion issued in corresponding PCT Application No. PCT/CN2019/110107, dated Dec. 27, 2019.
Zhang et al., Long short-term memory with attention and multitask learning for distant speech recognition, J Tsinghua Univ (Sci & Technol), 2018, vol. 58, No. 3, pp. 249-253, dated Mar. 15, 2018.

* cited by examiner

VOICE RECOGNITION METHOD AND APPARATUS, AND AIR CONDITIONER

CROSS-REFERENCE TO RELATED APPLICATIONS

The application is a continuation of International Application No. PCT/CN2019/110107, filed on Oct. 9, 2019, which claims priority to Chinese Patent Application No. 201910130206.9, filed on Feb. 21, 2019, the entire contents of which are hereby incorporated by reference.

TECHNICAL FIELD

The disclosure relates to the field of voice control technology, in particular to a voice recognition method, a voice recognition apparatus, a storage medium, and an air conditioner, especially related to a far-field voice recognition method and a voice recognition apparatus based on a microwave radar, a storage medium and an air conditioner.

BACKGROUND

Currently, voice recognition technology is a relatively mature human-computer interaction method. It has developed from initial near-field recognition technology such as handheld devices, e.g., Siri and various voice assistants, to recognition technology such as intelligent hardware, home appliances and robots. However, new human-computer interaction methods have more stringent requirements for hardware, software, and algorithms, and particularly the far-field voice recognition technology faces great challenge.

With the rapid development of the Smart Home System, smart homes such as voice air conditioners belong to far-field voice recognition technology. First, the voice interaction between humans and machines (here mainly refers to smart hardware, robots, etc.) is different from a traditional handheld device with a screen. In traditional voice interaction, because of the near-field, the quality of voice signal is relatively high, and the interaction link may be relatively simple with an assistance of a touch screen. By clicking on the screen for triggering, and then clicking the screen or energy Voice Activity Detection (VAD) detection to end the voice signal collection, i.e., one interaction can be completed, and the entire process can be completed through voice recognition, semantic understanding, and voice synthesis.

As for the interaction between humans and machines, the environment is more complicated since the far field is involved. And since there is no screen interaction, more problems need to be resolved in the entire interaction process if it were to be as natural, continuous, two-way, and interruptible as the communication between people. It is a process requiring integration of software and hardware, and cooperation between cloud and a terminal.

The training data of the current voice recognition algorithm mainly uses the voice collected on a mobile phone for training, which is only suitable for near-field recognition. For complex far-field voice data, there is a lot of reverberation and noise. Related technologies mainly use deep learning methods or microphone array methods to remove reverberation and noise. In actual applications, the location and direction data of the sound source cannot be sensed at the same time. Therefore, only general methods (such as a front-end microphone array method and a back-end neural network algorithm) are used to process voice data, and there are problems such as low far-field voice recognition rate, long response time, and poor noise reduction effect.

The use of deep learning methods or microphone array methods for removing reverberation and noise may include:
(1) Microphone array method is mainly used to improve the robustness of sound wave direction estimation in a reverberant scene. After detecting a direction of a beam by integrating multiple microphones, a beam forming technology is used to suppress surrounding non-stationary noise. However, due to limitations of a price and a size of a product, the number of microphones and a distance between each two microphones are limited, so that a direction range that can be distinguished is relatively small.
(2) Deep learning method: voice enhancement is achieved by filtering and singularizing the reverberation and noise voice data through signal processing, and replacing a beam forming technology with an algorithm such as DNN or RNN. But the processing has poor effect, especially when recognizing the far-field voice in a noisy environment.

The above content is only used to assist the understanding of the technical scheme of the present application, and does not mean that the above content is recognized as related technology.

SUMMARY

The purpose of the present application is to provide a voice recognition method, a voice recognition apparatus, a storage medium, and an air conditioner, in view of the above-mentioned defects, so as to solve the problem in which far-field voice recognition performance is poor when a deep learning method or a microphone array method is used to remove reverberation and noise from far-field voice data, thereby enhancing far-field voice recognition performance.

The present application provides a voice recognition method, including: acquiring first voice data; adjusting, according to the first voice data, a collection state of second voice data to obtain an adjusted collection state, and acquiring the second voice data based on the adjusted collection state; performing far-field voice recognition on the second voice data using a preset far-field voice recognition model so as to obtain semantic information corresponding to the second voice data.

Optionally, the first voice data includes a voice wake-up word, the voice wake-up word is voice data for waking up a voice device; and/or the second voice data includes a voice command, and the voice command is voice data for controlling the voice device; and/or the operation of acquiring first voice data, the operation of adjusting, according to the first voice data, a collection state of second voice data to obtain an adjusted collection state, and the operation of acquiring the second voice data based on the adjusted collection state are executed at a local side of a voice device; and/or for the operation of performing far-field voice recognition on the second voice data using a preset far-field voice recognition model, the feedback information obtained by the operation of the cloud is received at the local side by the voice device.

Optionally, the acquiring first voice data includes: acquiring the first voice data acquired by a voice collection device; and/or the acquiring the second voice data, includes: acquiring the second voice data collected by a voice collection device after the collection state is adjusted. The voice collection device includes: a microphone array provided with more than one microphone for collecting voice data in more than one direction.

Optionally, the adjusting, according to the first voice data, a collection state of second voice data, includes: after determining location information of a sound source sending the first voice data, performing at least one of the following: enhancing an intensity of the voice collection device that collects the first voice data to collect the second voice data on the location information; and/or suppressing an intensity of the voice collection device that collects the first voice data to collect the second voice data at locations except the location information.

Optionally, the determining location information of a sound source sending the first voice data includes: determining a direction of the sound source sending the first voice data using the voice collection device; locating the sound source based on the direction by using a locating device to obtain the location information of the sound source. The locating device includes: a microwave radar module; and the location information includes: a distance and a direction; and/or the enhancing an intensity of the voice collection device that collects the first voice data to collect the second voice data on the location information, includes: in a case that the voice collection device comprises a microphone array, turning on a microphone, on the location information, in the microphone array; and/or increasing the number of microphones turned on, on the location information, in the microphone array; and/or the suppressing an intensity of the voice collection device that collects the first voice data to collect the second voice data at locations except the location information, includes: turning off microphones at locations, except the location information, in the microphone array, and/or reducing the number of the microphones turned on, at locations, except the location information, in the microphone array.

Optionally, the performing far-field voice recognition on the second voice data using a preset far-field voice recognition model includes: preprocessing the second voice data to obtain voice information; performing, using the preset far-field voice recognition model, far-field voice recognition on the voice information obtained by preprocessing. The far-field voice recognition model includes: a far-field acoustic model obtained by deep learning training based on a Long Short-Term Memory Network (LSTM) algorithm.

Optionally, the method further includes: collecting voice data and sound source data of the voice data; and performing training, after the voice data and the sound source data is preprocessed, with an LSTM model to obtain a far-field voice recognition model based on LSTM.

Matching with the above method, another aspect of the present application provides a voice recognition apparatus, including: an acquiring unit, configured to acquire first voice data; the acquiring unit is further configured to adjust, according to the first voice data, a collection state of second voice data to obtain an adjusted collection state, and acquire the second voice data based on the adjusted collection state; an identification unit, configured to perform far-field voice recognition on the second voice data using a preset far-field voice recognition model so as to obtain semantic information corresponding to the second voice data.

Optionally, the first voice data includes a voice wake-up word, the voice wake-up word is voice data for waking up a voice device; and/or the second voice data includes a voice command, and the voice command is voice data for controlling the voice device; and/or the operation of acquiring first voice data, the operation of adjusting, according to the first voice data, a collection state of second voice data to obtain an adjusted collection state, and the operation of acquiring the second voice data based on the adjusted collection state are executed at a local side of a voice device; and/or for the operation of performing far-field voice recognition on the second voice data using a preset far-field voice recognition model, the feedback information obtained by the operation of the cloud is received at the local side by the voice device.

Optionally, the acquiring, by the acquiring unit, the first voice data, includes: acquiring the first voice data collected by a voice collection device; and/or the acquiring, by the acquiring unit, the second voice data, includes: acquiring the second voice data collected by a voice collection device after the collection state is adjusted. The voice collection device includes: a microphone array provided with more than one microphone for collecting voice data in more than one direction.

Optionally, the adjusting, by the acquiring unit, according to the first voice data, a collection state of second voice data, includes: after determining location information of a sound source sending the first voice data, performing at least one of the following: enhancing an intensity of the voice collection device that collects the first voice data to collect the second voice data on the location information; and/or suppressing an intensity of the voice collection device that collects the first voice data to collect the second voice data at locations except the location information.

Optionally, the determining, by the acquiring unit, location information of a sound source sending the first voice data, includes: determining a direction of the sound source sending the first voice data using the voice collection device; locating the sound source based on the direction by using a locating device to obtain the location information of the sound source. The locating device includes: a microwave radar module; and the location information includes: a distance and a direction; and/or the enhancing, by the acquiring unit, a collection intensity of the second voice data on the location information by the voice collection device that collects the first voice data, includes: in a case that the voice collection device includes a microphone array, turning on a microphone, on the location information, in the microphone array, and/or increasing the number of microphones turned on, on the location information, in the microphone array; and/or the suppressing, by the acquiring unit, a collection intensity of the second voice data at locations except the location information by the voice collection device that collects the first voice data, includes: turning off microphones at locations, except the location information, in the microphone array, and/or reducing the number of the microphones turned on, at locations, except the location information, in the microphone array.

Optionally, the performing, by the identification unit, far-field voice recognition on the second voice data using a preset far-field voice recognition model, includes: preprocessing the second voice data to obtain voice information; performing, using the preset far-field voice recognition model, far-field voice recognition on the voice information obtained by pre-processing. The far-field voice recognition model includes: a far-field acoustic model obtained by deep learning training based on an LSTM algorithm.

Optionally, the acquiring unit is further configured to collect voice data and sound source data of the voice data; and the identification unit is further configured to perform training, after the voice data and the sound source data is preprocessed, with an LSTM model to obtain a far-field voice recognition model based on LSTM.

Matching with the above-mentioned apparatus, another aspect of the present application provides an air conditioner, which includes: the above-mentioned voice recognition apparatus.

Matching with the above method, another aspect of the present application provides a storage medium for storing a plurality of instructions loaded by a processor to execute the voice recognition method mentioned above.

Matching with the above method, another aspect of the present application provides another air conditioner, which includes: a processor for executing a plurality of instructions; a storage medium for storing the plurality of instructions. The plurality of instructions are stored in the storage medium and are loaded by the processor to execute the voice recognition method mentioned above.

In the solution of the present application, various surrounding environments are automatically recognized through microwave radar technology, and a deep learning algorithm is used, thereby improving the accuracy of far-field voice recognition, and bringing a good user experience.

Furthermore, in the solution of the present application, a microwave radar technology is used to locate a sound source location, a collection state of the microphone array is adjusted according to the sound source location, and the far-field voice recognition model trained based on an LSTM deep learning algorithm is further used to perform far-field recognition on voice data, ensuring a high recognition rate to meet the needs of use in a complex environment.

Furthermore, in the solution of the present application, voice data is converted into text data accurately and efficiently by using a far-field voice recognition model trained by a sound source and voice data based on a microwave radar technology and combined with an LSTM deep learning algorithm model, which can improve the effect of far-field voice recognition.

Furthermore, in the solution of the present application, combining front-end information processing technology with back-end voice recognition technology, namely: acquiring the location parameter of the sound source by combining microwave radar technology, combining audio data and location data (such as the location parameter of the sound source), and obtaining the far-field acoustic model by training it through LSTM algorithm suitable for long audio data and audio data context. This solution can shorten the response time and improve the noise reduction effect.

Furthermore, in the solution of the present application, on the basis of using a microphone array to roughly identify the direction of the sound source of the wake-up word voice, the distance and direction of the sound source are accurately calculated in real time by using microwave radar technology, and then a state of microphone array is controlled in real time by using edge computing technology, and using a far-field acoustic model based on LSTM is trained and used by combining with the sound source data and voice data, the efficiency of far-field recognition and noise reduction can be improved, and the response time can be shorten.

Therefore, in the solution of the present application, by locating the sound source location by using microwave radar technology, adjusting the collection state of the microphone array according to the sound source location, and further performing far-field voice recognition on voice data by using the far-field voice recognition model obtained by training based on an LSTM deep learning algorithm, the problem in which far-field voice recognition performance is poor when a deep learning method or a microphone array method is used to remove reverberation and noise from far-field voice data can be solved. Therefore, the defects of low far-field voice recognition rate, long response time, and poor noise reduction effect in the related technology are overcome, and the beneficial effects of high far-field recognition efficiency, short response time and good noise reduction effect are achieved.

Other characteristics and advantages of the present application will be described in the following specification, and will be apparent partly from the specification, or will be understood by implementing the embodiments of the present application.

The technical scheme of the present application is described in detail by accompanying drawings and embodiments.

DETAILED DESCRIPTION OF THE EMBODIMENTS

A clear and complete description of technical solutions of the embodiments of the utility model will be given below, in combination with the accompanying drawings in the embodiments of the utility model. Apparently, the embodiments described below are a part, but not all, of the embodiments of the utility model. All of other embodiments, obtained by those skilled in the art based on the embodiments of the utility model without any inventive efforts, fall into the protection scope of the present invention.

Figure 1:
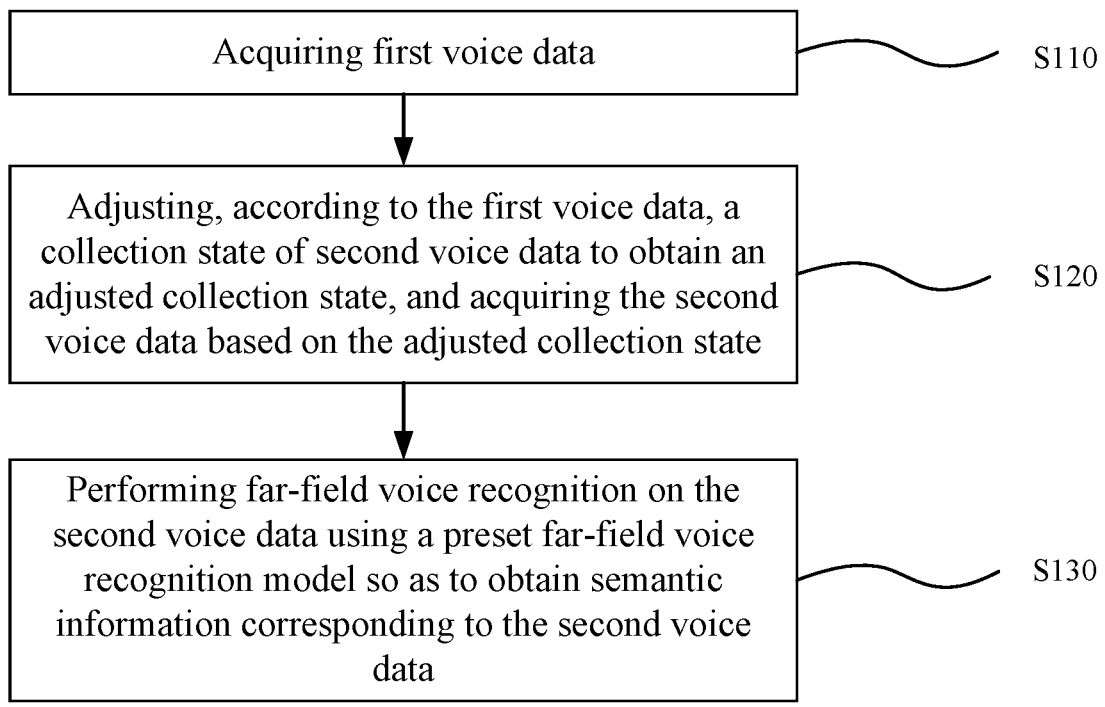
FIG. 1 is a schematic flowchart of a voice recognition method according to an embodiment of the present application.

According to an embodiment of the present application, a voice recognition method is provided. FIG. 1 is a schematic flowchart of a voice recognition method according to an embodiment of the present application. The voice recognition method may include: Step S110 to Step S130.

Step S110: acquiring the first voice data.

The first voice data may include a voice wake-up word, and the first voice data may further include a voice command. The voice wake-up word is voice data for waking up a voice device.

Therefore, by acquiring multiple forms of first voice data, it is convenient to adjust a collection state of second voice data based on the first voice data in different situations, thereby improving the convenience and versatility of user's usage.

Optionally, the acquiring the first voice data in step S110 may include: acquiring the first voice data collected by a voice collection device.

Therefore, the first voice data may be acquired by the method of acquiring the first voice data by the voice collection device, so that the acquisition of the first voice data is more convenient and accurate.

Step S120: adjusting, according to the first voice data, a collection state of second voice data to obtain an adjusted collection state, and acquiring the second voice data based on the adjusted collection state.

For example, on a device-side processing platform, first, a sound source of the wake-up word is located approximately by using a microphone array (e.g., the location of the sound source of the wake-up word is determined according to the direction of sound waves through the microphone array); then, the microwave radar module is used to accurately locate the sound source, and collect the data of distance and direction (namely, the distance and direction of the sound source); next, microphone(s) at the corresponding position in the microphone array module is turned on and off according to the data; finally, audio data of far-field is collected.

The second voice data includes a voice command, and the second voice data may also include next voice wake-up word. The voice command is voice data for controlling the voice device.

Therefore, by acquiring multiple forms of second voice data, the various voice control requirements of the user can be met flexibly and conveniently.

Specifically, the operation of acquiring first voice data in step S110, the operation of adjusting, according to the first voice data, a collection state of second voice data in step S120, and the operation of acquiring the second voice data based on the adjusted collection state are executed at a local side of a voice device.

Therefore, by performing the operations of acquiring the first voice data and the second voice data and adjusting the collection state of the second voice data based on the first voice data at the local side of the voice device, the accuracy and reliability of the acquisition can be improved, and the efficiency of processing can be improved.

Figure 2:
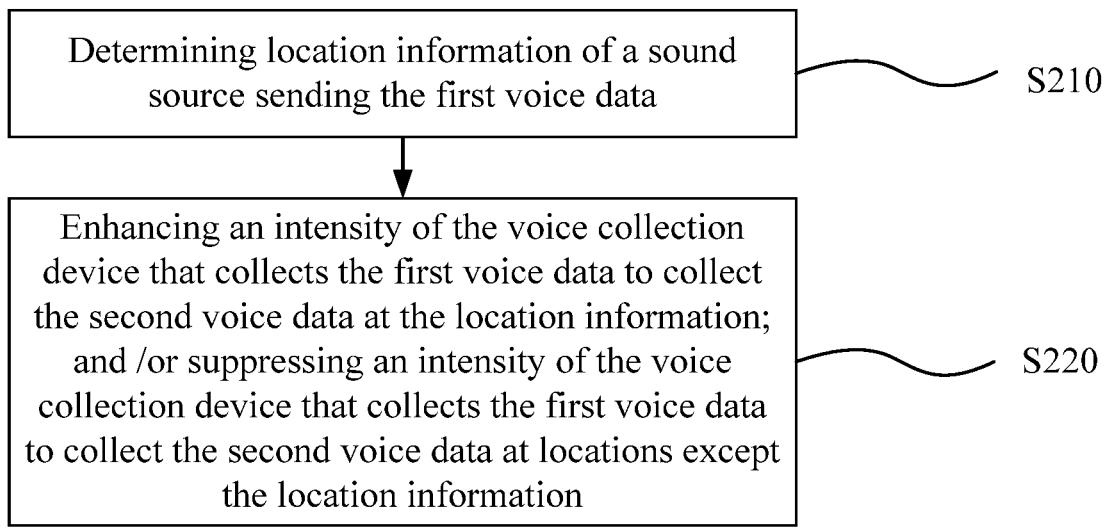
FIG. 2 is a schematic flowchart of a method of adjusting a collection state of second voice data according to the first voice data according to an embodiment of the present application.

Optionally, with reference to FIG. 2 which is a schematic flowchart of a method of adjusting a collection state of second voice data according to the first voice data according to an embodiment of the present application, the specific process of adjusting a collection state of second voice data according to the first voice data in step S120 may include: step S210 and step S220.

Step S210: determining location information of a sound source sending the first voice data.

Figure 3:
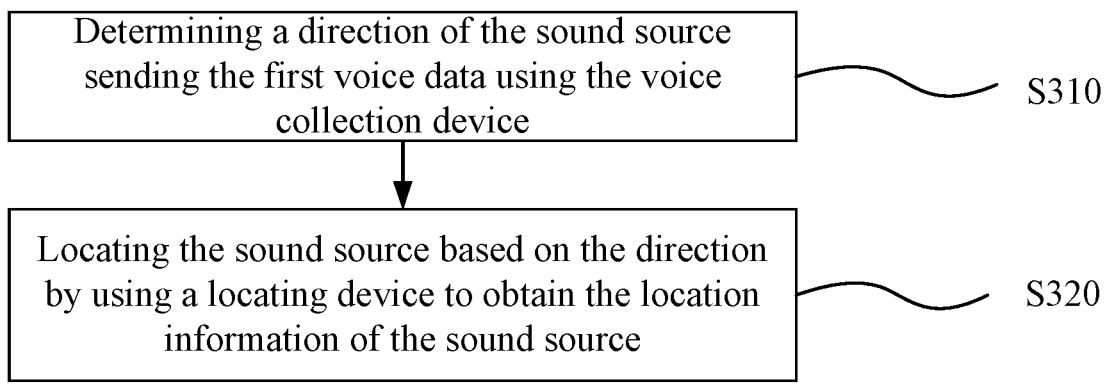
FIG. 3 is a schematic flowchart of a method of determining location information of a sound source sending the first voice data according to first voice data according to an embodiment of the present application.

Moreover, optionally, with reference to FIG. 3 which is a schematic flowchart of a method of determining location information of a sound source sending the first voice data according to an embodiment of the present application, the specific process of determining location information of a sound source sending the first voice data in Step S210, may include: Step S310 and Step S320.

Step S310: determining a direction of the sound source sending the first voice data using the voice collection device.

For example: roughly identifying a direction of a sound source for a wake-up word voice using a microphone array may include: the voice recognition system needs to wake up a device through the voice wake-up word (such as: a certain air conditioner). In the solution of the present application, an approximate direction of the voice source for the wake-up word can be obtained through the microphone array technology in advance.

Step S320: locating the sound source based on the direction by using a locating device to obtain the location information of the sound source.

The locating device may include: a microwave radar module, the locating device may further include other locating modules, thus solving the problem of far-field voice recognition in complex situation based on microwave radar locating technology. The location information may include: a distance and a direction.

For example: the distance and direction of the sound source is accurately calculated in real time using microwave radar technology, may include: microwave radar sends a microwave signal through a sending device, and the microwave signal will be reflected when it encounters an object. By receiving the reflected microwave signal by a receiving device, data such as the position, size, and shape of the object in an environment can be obtained. In the solution of the present application, this technology can be used to obtain location data of the sound source (the person making a sound).

Therefore, by determining the direction of the sound source of the first voice data by the voice collection device, and locating the sound source based on the direction using a locating device to locate the location information of the sound source, the location information of the sound source of the first voice data may be determined accurately and reliably.

Step S220: based on the location information, enhancing an intensity of the voice collection device that collects the first voice data to collect the second voice data on the location information based on the location information, and/or suppressing an intensity of the voice collection device that collects the first voice data to collect the second voice data at locations except the information location to adjust the collection state of the voice collection device for the second voice data. The collection state of the voice collection device may include: the collection intensity of the voice collection device.

For example, in a far-field environment, a combination of cloud (such as, cloud processing platform) and terminal (such as, a device processing side or a processing platform at a device side) is used. On the device processing side, first, the sound source direction of the wake-up word is roughly identified by using the microphone array, then, the distance and direction of the sound source is calculated accurately in real time by using a microwave radar technology, and then the state of the microphone array is controlled in real time by using an edge computing technology.

Thus, the intensity of the voice collection device to collect the second voice data is adjusted based on the location information of the sound source of the first voice data, thus improving the convenience and reliability of the collection of the second voice data.

Moreover, optionally, in step S220, the operation of enhancing an intensity of the voice collection device that collects the first voice data to collect the second voice data on the location information, and/or suppressing an intensity of the voice collection device that collects the first voice data to collect the second voice data at locations except the location information may include at least one of the following adjustment situations.

The first adjustment situation: the enhancing an intensity of the voice collection device that collects the first voice data to collect the second voice data on the location information, may include: in a case that the voice collection device may include microphone array, turning on a microphone, on the location information, in the microphone array, and/or increasing the number of microphones turned on, on the location information, in the microphone array.

The second adjustment situation: the suppressing an intensity of the voice collection device that collects the first voice data to collect the second voice data at locations except the location information, may include: turning off microphones at locations, except the location information, in the microphone array, and/or reducing the number of the microphones turned on, at locations, except the location information, in the microphone array.

For example: the state of the microphone array is controlled in real time by using the edge computing technology, includes: there are multiple microphone devices in the microphone array of the present application, and the state of the microphone is adjusted by a front-end device on the basis of acquiring the approximate location and direction of the sound source through the wake-up word. For example: the microphone array has an effect of 4 microphones in different directions, and it is obtained that the sound source is in a straight-ahead position. At this time, a reception effect (an ability to receive voice signals) of the microphone at the direction may be enhanced, and a reception effect of the microphone at other directions may be suppressed, thereby removing noise in other directions.

Therefore, by enhancing or reducing the collection intensity of the voice collection device at different locations based on the location information of the first voice data, the accuracy and reliability of the second voice data collection by the voice collection device can be improved, thus improving the accuracy and reliability of voice recognition and voice control.

Optionally, the acquiring the second voice data in step S120 may include: acquiring the second voice data collected by the voice collection device after the collection state is adjusted.

Thus, it is more convenient and accurate to acquire the second voice data by collecting it through the voice collection device.

The voice collection device may include: a microphone array. The microphone array is provided with more than one microphone that can be used to collect voice data in more than one direction.

Therefore, the method of acquiring voice data using the microphone array is flexible, and the acquired result is reliable.

In step S130, performing far-field voice recognition on the second voice data using a preset far-field voice recognition model to obtain semantic information corresponding to the second voice data, so as to control the voice device to execute the second voice data according to the semantic information. The semantic information may include: semantic text data. For instance, the text data may be obtained by converting voice data into text data through a trained acoustic model.

For example, on a cloud processing platform, first, the LSTM acoustic model is trained using manually collected and labeled sound sources and audio databases to obtain a far-field voice recognition model; then, through real-time collection of voice data, real-time far-field voice recognition is performed on the above model; finally, high-accuracy voice and text data is obtained in a complex environment. In complex scenarios, far-field voice recognition can be performed accurately and efficiently based on microwave radar technology.

Therefore, by acquiring the second voice data after adjusting the collection state of the second voice data based on the first voice data, the accuracy and reliability of the acquirement of the second voice data can be guaranteed; and by performing far-field voice recognition on the second voice data using the preset far-field voice recognition model, the efficiency and effect of far-field voice recognition on the second voice data can be improved.

Specifically, for the operation of performing far-field voice recognition on the second voice data using a preset far-field voice recognition model in step S130, the feedback information obtained by the operation of the cloud is received at the local side by the voice device.

Therefore, the operation of performing far-field voice recognition on the second voice data using the preset far-field voice recognition model is executed by the cloud, and then the operation result is fed back to the local side of the voice device. On the one hand, the efficiency of data processing and the reliability of storage can be improved; on the other hand, the pressure of data processing and storage at the local side of the voice device can be reduced, thereby improving the convenience and reliability of voice control by the voice device.

Figure 4:
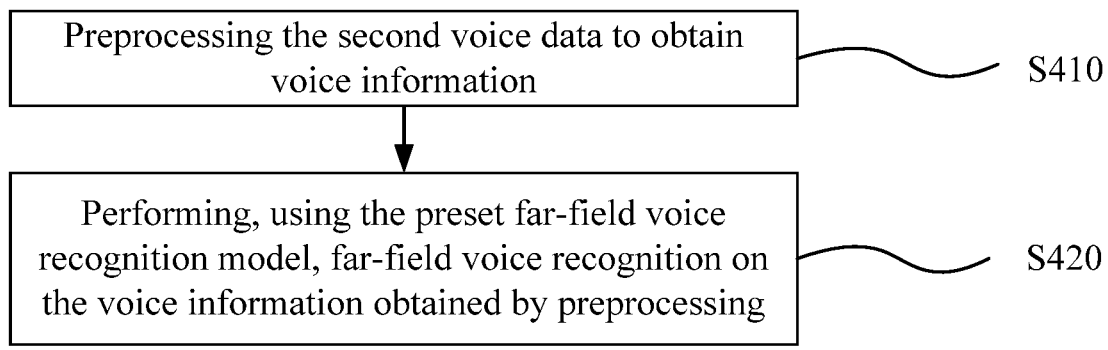
FIG. 4 is a schematic flowchart of a method of performing far-field voice recognition on the second voice data using a preset far-field voice recognition model according to an embodiment of the present application.

Optionally, with reference to FIG. 4 which is a schematic flowchart of a method of performing far-field voice recognition on the second voice data using a preset far-field voice recognition model according to an embodiment of the present application, the specific process of performing far-field voice recognition on the second voice data using the set far-field voice recognition model may include: step S410 and step S420.

Step S410: preprocessing the second voice data to obtain voice information.

Step S420: performing, using the preset far-field voice recognition model, far-field voice recognition on the voice information obtained by preprocessing. The preprocessing may include: preprocessing such as missing values, standardization and noise reduction.

The far-field voice recognition model may include: a far-field acoustic model obtained by deep learning training based on an LSTM algorithm.

Figure 7:
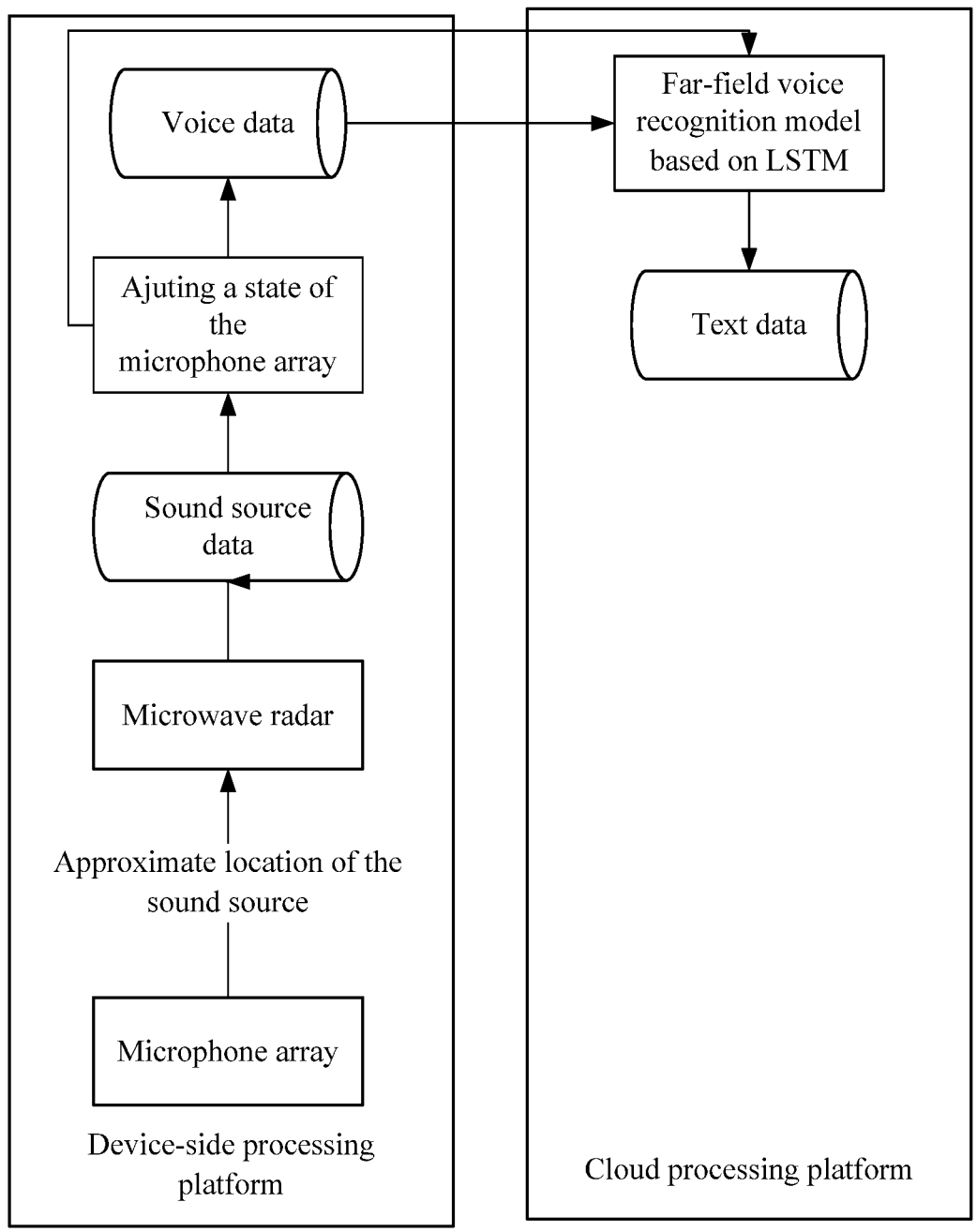
FIG. 7 is a schematic structural diagram of a far-field voice recognition system based on microwave radar according to an embodiment of an air conditioner of the present application.

For example, in a system shown in FIG. 7, the microphone array receives voice data and determines an approximate location of the sound source of the wake-up word. The microwave radar acquires a location parameter (direction and distance data) of the sound source, namely, acquires the sound source data. Adjusting a state of the microphone array refers to enhance or suppress a microphone in a corresponding direction according to the sound source location. The far-field acoustic model based on LSTM converts voice data into corresponding text data through the acoustic model trained by sound source data and voice data.

Figure 8:
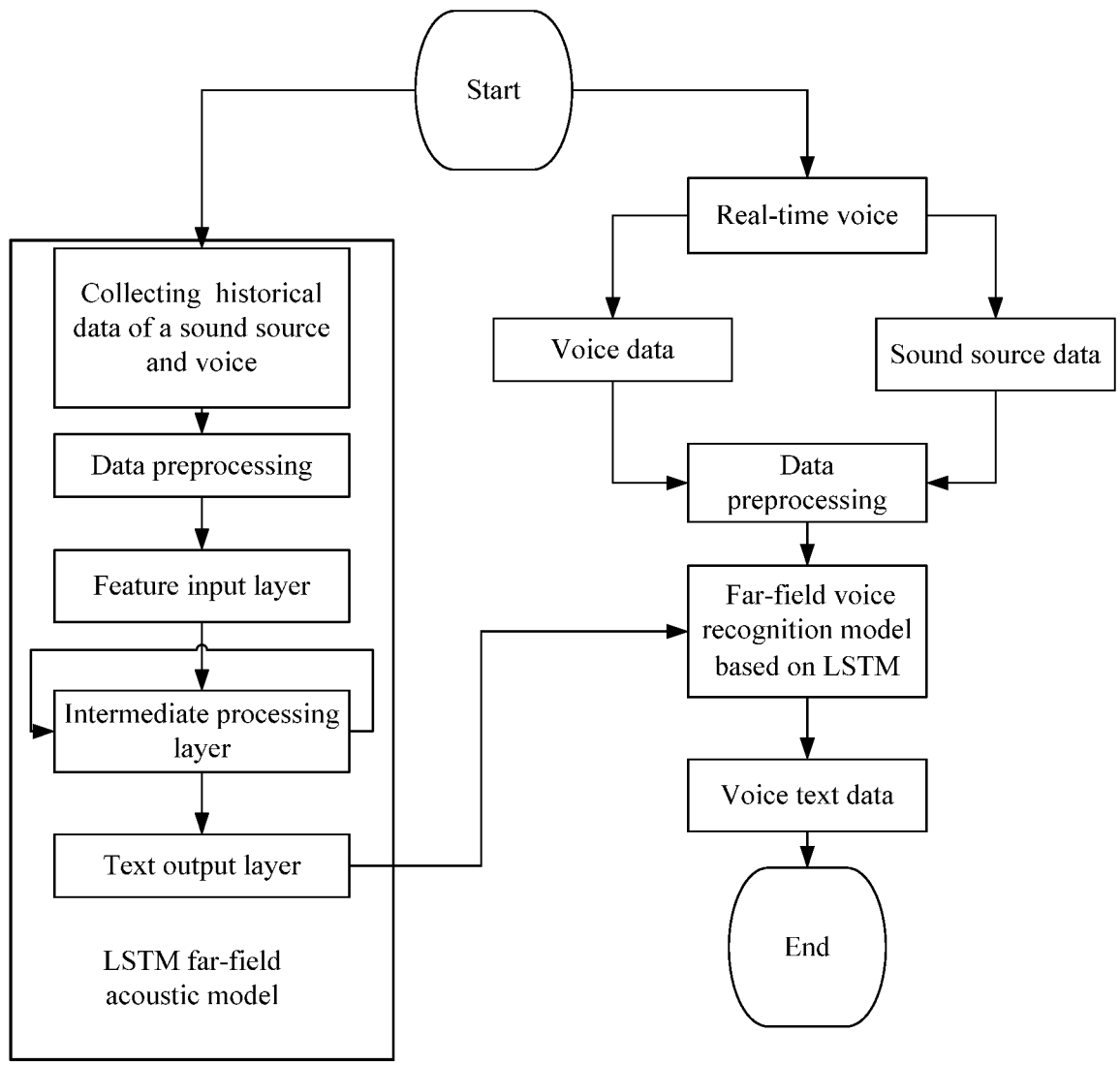
FIG. 8 is a schematic flowchart of a far-field voice recognition algorithm based on microwave radar according to an embodiment of an air conditioner of the present application.

For example, referring to the example shown in FIG. 8, after training the LSTM acoustic model, collecting real-time voice, that is, monitoring the air-conditioner voice in real-time, and collecting voice data and sound source data. Preprocessing data may be the same as the data preprocessing method of training the LSTM acoustic model in step 1. The LSTM-based far-field acoustic model recognizes the voice using the far-field LSTM acoustic model trained by the method of training the LSTM acoustic model. Voice text data is a corresponding text data acquired according to a voice recognition result of the model. The voice data is converted into text data accurately and efficiently by using the far-field voice recognition model trained by the sound source and voice data based on microwave radar technology and combined with LSTM deep learning algorithm model so as to provide a far-field voice system with a high recognition rate which meets the needs of users.

Therefore, by preprocessing the collected second voice data, the accuracy and reliability of the second voice data itself can be improved; and then, by far-field recognizing the voice information preprocessed by the preset far-field recognition model, the accuracy and reliability of the recognition of the second voice data can be ensured.

In an alternative embodiment, the method may further include a process of training to obtain the preset far-field voice recognition model.

Figure 5:
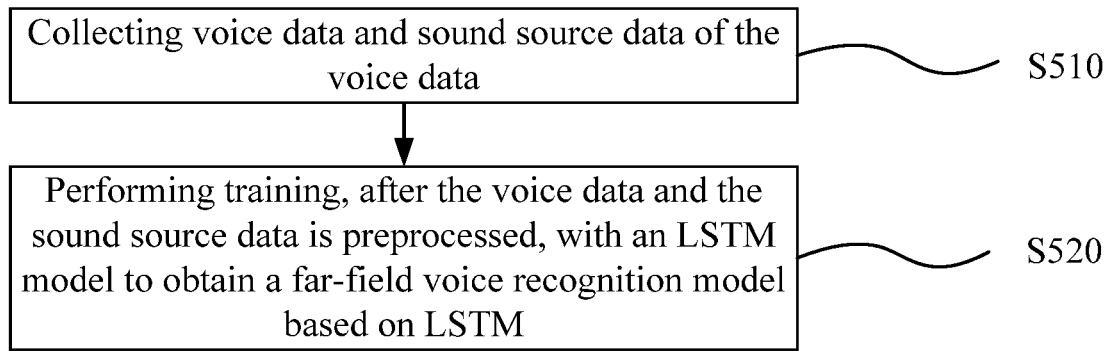
FIG. 5 is a schematic flowchart of a method of obtaining a far-field voice recognition model by training according to an embodiment of the present application.

With reference to FIG. 5 which is a schematic flowchart of a method of training to obtain a preset far-field voice recognition model according to an embodiment of the present application, the specific process of training to obtain a preset far-field voice recognition model may include: step S510 and step S520.

Step S510: collecting voice data and its sound source data. The voice data may include a wake-up word and/or a voice command. For example, the sound source data may include a location parameter of the sound source (direction and distance data) and the voice data may be voice data collected by microphone in the microphone array of which the state has been adjusted.

Step S520: performing training, after the voice data and the sound source data is preprocessed, with an LSTM model to obtain a far-field voice recognition model based on LSTM. For the operation of collecting voice data and its sound source data, the operation of preprocessing the voice data and its sound source data, and the operation of training using the LSTM model, the feedback information obtained by the operation of the cloud is received at the local side by the voice device. For example: on the cloud processing end, a far-field acoustic model based on LSTM is trained and used by combining with sound source data and voice data.

For example, combining the front-end information processing technology and the back-end voice recognition technology, that is, acquiring the location parameter of the sound source by combining the microwave radar technology, combining the audio data and location data (such as the location parameter of the sound source), and obtaining the far-field acoustic model by training it through LSTM algorithm suitable for long audio data and audio data context. Various surrounding environments are automatically recognized through microwave radar technology, and a deep learning algorithm is used to improve the accuracy of far-field voice recognition.

For example: referring to an example shown in FIG. 8, the training an LSTM acoustic model may include: collecting the aforementioned historical data (historical record data of sound source and voice); data preprocessing is a preprocessing, such as missing values, standardization and noise reduction, on the data; loading data into the model through an input layer of the LSTM model; intermediate processing layer of the LSTM model; text output layer outputs text data converted from the voice data to obtain a far-field acoustic model based on LSTM.

Therefore, by pre-collecting voice data and its sound source data and preprocessing it using the LSTM model, the far-field recognition model based on LSTM is obtained, which can be used to facilitate the far-field voice recognition of the second voice data using the far-field voice recognition model, and a high recognition rate is high, a recognition effect is good.

After a large number of experimental verifications, the technical solution of this embodiment is adopted to automatically recognize various surrounding environments through microwave radar technology, and a deep learning algorithm is used, thereby improving the accuracy of far-field voice recognition, and bringing a good user experience.

Figure 6:
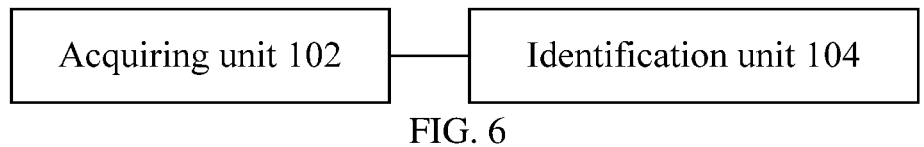
FIG. 6 is a schematic structural diagram of a voice recognition apparatus according to an embodiment of the present application.

According to an embodiment of the present application, a voice recognition apparatus corresponding to the voice recognition method is also provided. With reference to FIG. 6 which is a schematic structural diagram of an embodiment of the apparatus of the present application. The voice recognition apparatus may include: an acquiring unit 102 and an identification unit 104.

In an alternative example, the acquiring unit 102 may be configured to acquire the first voice data. The specific functions and processing of the acquiring unit 102 may refer to step S110.

The first voice data may include: a voice wake-up word, and the first voice data may further include a voice command. The voice wake-up word is voice data for waking up a voice device.

Therefore, by acquiring multiple forms of first voice data, it is convenient to adjust a collection state of the second voice data based on the first voice data in different situations, thereby improving the convenience and versatility of user's usage.

Optionally, the acquiring unit 102 may be configured to acquire the first voice data may include: the acquiring unit 102 is configured to acquire first voice data collected by the voice collection device.

Therefore, acquiring the first voice data by the method of acquiring the first voice data through voice collection device makes the acquisition of the first voice data more convenient and accurate.

In an alternative example, the acquiring unit 102 is further configured to adjust, according to the first voice data, a collection state of second voice data, and acquire the second voice data based on the adjusted collection state. The specific functions and processing of the acquiring unit 102 may refer to step S120.

For example: on a device-side processing platform, first, a sound source of the wake-up word is located approximately by using a microphone array (e.g., the location of the sound source of the wake-up word is determined according to the direction of sound waves through the microphone array); then, the microwave radar module is used to accurately locate the sound source, and collect the data of distance and direction (namely, the distance and direction of the sound source); next, microphone(s) at the corresponding position in the microphone array module is turned on and off according to the data; finally, audio data of far-field is collected.

The second voice data includes a voice command, and the second voice data may also include next voice wake-up word. The voice command is voice data for controlling the voice device.

Therefore, by acquiring multiple forms of second voice data, the various voice control requirements of the user can be met flexibly and conveniently.

Specifically, the operation of acquiring first voice data by the acquiring unit 102, the operation of adjusting, according to the first voice data, a collection state of second voice data by the acquiring unit 102, and the operation of acquiring the second voice data based on the adjusted collection state are executed at a local side of a voice device.

Therefore, by performing the operations of acquiring the first voice data and the second voice data and adjusting the collection state of the second voice data based on the first voice data at the local side of the voice device, the accuracy and reliability of the acquisition can be improved, and the efficiency of processing can be improved.

Optionally, the acquiring unit 102 may be configured to adjust the collection state of the second voice data according to the first voice data may include:

The acquiring unit 102 may further be configured to determine location information of a sound source sending the first voice data. The specific function and processing of the acquiring unit 102 may refer to step S210.

Optionally, the acquiring unit 102 may be configured to determine location information of a sound source sending the first voice data may include:

The acquiring unit 102 may further be specifically configured to determine a direction of the sound source sending the first voice data using the voice collection device. The specific functions and processing of the acquiring unit 102 may refer to step S310.

For example: roughly identifying a direction of a sound source for a wake-up word voice using a microphone array may include: the voice recognition system needs to wake up a device through the voice wake-up word (such as: a certain air conditioner). In the solution of the present application, an approximate direction of the voice source for the wake-up word can be obtained through the microphone array technology in advance.

The acquiring unit 102 may further be specifically configured to locate the sound source based on the direction by using a locating device to obtain the location information of the sound source. The specific functions and processing of the acquiring unit 102 may refer to step S320.

The locating device may include: a microwave radar module, and the locating device may further include other locating modules, thus solving the problem of far-field voice recognition in complex situation based on microwave radar locating technology. The location information may include: a distance and a direction.

For example: the distance and direction of the sound source is accurately calculated in real time using microwave radar technology, may include: microwave radar sends a microwave signal through a sending device, and the microwave signal will be reflected when it encounters an object. By receiving the reflected microwave signal by a receiving device, data such as the position, size, and shape of the object in an environment can be obtained. In the solution of the present application, this technology can be used to obtain location data of the sound source (the person making a sound).

Therefore, by determining the direction of the sound source of the first voice data by the voice collection device, and locating the sound source based on the direction using a locating device to locate the location information of the sound source, the location information of the sound source of the first voice data may be determined accurately and reliably.

The acquiring unit 102 may further be specifically configured to, based on the location information, enhance an intensity of the voice collection device that collects the first voice data to collect the second voice data on the location information, and/or suppress an intensity of the voice collection device that collects the first voice data to collect the second voice data at locations except the location information to adjust the collection state of the voice collection device for the second voice data. The collection state of the voice collection device may include: the collection intensity of the voice collection device. The specific functions and processing of the acquiring unit 102 may refer to step S220.

For example, in a far-field environment, a combination of cloud (such as, cloud processing platform) and terminal (such as, a device processing side or a processing platform at a device side) is used. On the device processing side, first, the sound source direction of the wake-up words is roughly identified by using the microphone array, then, the distance and direction of the sound source is calculated accurately in real time by using a microwave radar technology, and then, the state of the microphone array is controlled in real time by using an edge computing technology.

Thus, the intensity of the voice collection device to collect the second voice data is adjusted based on the location information of the sound source of the first voice data, thus improving the convenience and reliability of the collection of the second voice data.

Moreover, optionally, the operation of enhancing an intensity of the voice collection device that collects the first voice data to collect the second voice data on the location information, and/or suppressing an intensity of the voice collection device that collects the first voice data to collect the second voice data at locations except the location information by the acquiring unit 102 may include at least one of the following adjustment situations.

The first adjustment situation: the acquiring unit 102 enhances an intensity of the voice collection device that collects the first voice data to collect the second voice data on the location information, may include: the acquiring unit 102 may further be configured to, in a case that the voice collection device may include microphone array, turn on a microphone, on the location information, in the microphone array, and/or to increase the number of microphones turned on, on the location information, in the microphone array.

The second adjustment situation: the acquiring unit 102 suppresses an intensity of the voice collection device that collects the first voice data to collect the second voice data at locations except the location information, may include: the acquiring unit 102 may further be configured to turn off microphones at locations, except the location information, in the microphone array, and/or reduce the number of the microphones turned on, at locations, except the location information, in the microphone array.

For example: the state of the microphone array is controlled in real time by using the edge computing technology, includes: there are multiple microphone devices in the microphone array of the present application, and the state of the microphone is adjusted by a front-end device on the basis of acquiring the approximate location and direction of the sound source through the wake-up word. For example: the microphone array has an effect of 4 microphones in different directions, and it is obtained that the sound source is in a straight-ahead position. At this time, a reception effect (an ability to receive voice signals) of the microphone at the direction may be enhanced, and a reception effect of the microphone at other directions may be suppressed, thereby removing noise in other directions.

Therefore, by enhancing or reducing the collection intensity of the voice collection device at different locations based on the location information of the first voice data, the accuracy and reliability of the second voice data collection by the voice collection device can be improved, thus improving the accuracy and reliability of voice recognition and voice control.

Optionally, the acquiring unit 102 is configured to acquire the second voice data may include: the acquiring unit 102 may be specifically configured to acquire the second voice data collected by the voice collection device after the collection state is adjusted.

Thus, it is more convenient and accurate to acquire the second voice data by collecting it through the voice collection device.

The voice collection device may include: a microphone array. The microphone array is provided with more than one microphone that can be used to collect voice data in more than one direction.

Therefore, the method of acquiring voice data using the microphone array is flexible, and the acquired result is reliable.

In an optional example, the identification unit 104 may be configured to perform far-field voice recognition on the acquired second voice data using a preset far-field voice recognition model to obtain semantic information corresponding to the second voice data, so as to control the voice device to execute the second voice data according to the semantic information. The specific functions and processing of the identification unit 104 may refer to step S130. The semantic information may include: semantic text data. For instance: the text data may be obtained by converting voice data into text data through a trained acoustic model.

For example: on the cloud processing platform, first, the LSTM acoustic model is trained using manually collected and labeled sound sources and audio databases to obtain a far-field voice recognition model; then, through real-time collection of voice data, real-time far-field voice recognition is performed on the above model; finally, high-accuracy voice and text data is obtained in a complex environment. In complex scenarios, far-field voice recognition can be performed accurately and efficiently based on microwave radar technology.

Therefore, by acquiring the second voice data after adjusting the collection state of the second voice data based on the first voice data, the accuracy and reliability of the acquirement of the second voice data can be guaranteed; and by performing far-field voice recognition on the second voice data using the preset far-field voice recognition model, the efficiency and effect of far-field voice recognition on the second voice data can be improved.

Specifically, for the operation of performing far-field voice recognition on the second voice data using a preset far-field voice recognition model by the identification unit 104, the feedback information obtained by the operation of the cloud is received at the local side by the voice device.

Therefore, the operation of performing far-field voice recognition on the second voice data using the preset far-field voice recognition model is executed by the cloud, and then the operation result is fed back to the local side of the voice device. On the one hand, the efficiency of data processing and the reliability of storage can be improved; on the other hand, the pressure of data processing and storage at the local side of the voice device can be reduced, thereby improving the convenience and reliability of voice control by the voice device.

Optionally, the identification unit 104 is configured to perform far-field voice recognition on the second voice data using a preset far-field voice recognition model, may include:

The identification unit 104 may specifically be configured to preprocess the second voice data to obtain voice information. The specific function and processing of the identification unit 104 may refer to step S410.

The identification unit 104 may further be configured to perform, using the preset far-field voice recognition model, far-field voice recognition on the voice information obtained by preprocessing. The preprocessing may include: preprocessing such as missing values, standardization, and noise reduction. The specific function and processing of the identification unit 104 may refer to step S420.

The far-field voice recognition model may include: a far-field acoustic model obtained by deep learning training based on an LSTM algorithm.

For example, in a system shown in FIG. 7, the microphone array receives voice data and determines an approximate location of the sound source of the wake-up word. The microwave radar acquires a location parameter (direction and distance data) of the sound source, namely, acquires the sound source data. Adjusting a state of the microphone array refers to enhance or suppress a microphone in a corresponding direction according to the sound source location. The far-field acoustic model based on LSTM converts voice data into corresponding text data through the acoustic model trained by sound source data and voice data.

For example: referring to an example shown in FIG. 8, after training the LSTM acoustic model, collecting real-time voice, that is, monitoring the air-conditioner voice in real-time, and collecting voice data and sound source data. Preprocessing data may be the same as the data preprocessing method of training the LSTM acoustic model in step 1. The LSTM-based far-field acoustic model recognizes the voice using the far-field LSTM acoustic model trained by the method of training the LSTM acoustic model. Voice text data is a corresponding text data acquired according to a voice recognition result of the model. The voice data is converted into text data accurately and efficiently by using the far-field voice recognition model trained by the sound source and voice data based on microwave radar technology and combined with LSTM deep learning algorithm model, so as to provide a far-field voice system with a high recognition rate which meets the needs of users.

Therefore, by preprocessing the collected second voice data, the accuracy and reliability of the second voice data itself can be improved; and then, by far-field recognizing the voice information preprocessed by the preset far-field recognition model, the accuracy and reliability of the recognition of the second voice data can be ensured.

In an alternative embodiment, a process of training to obtain the preset far-field voice recognition model may be further included.

The acquiring unit 102 may further be configured to collect voice data and its sound source data. The voice data may include a wake-up word and/or a voice command. The specific function and processing of the acquiring unit 102 may refer to step S510. For example, the sound source data may include a location parameter of the sound source (direction and distance data) and the voice data may be voice data collected by microphone in the microphone array of which the state has been adjusted.

The identification unit 104 may further be configured to perform training, after the voice data and the sound source data is preprocessed, with an LSTM model to obtain a far-field voice recognition model based on LSTM. For the operation of collecting voice data and its sound source data, the operation of preprocessing the voice data and its sound source data, and the operation of training using the LSTM model, the feedback information obtained by the operation of the cloud is received at the local side by the voice device. The specific function and processing of the identification unit 104 may refer to step S520. For example: on the cloud processing end, a far-field acoustic model based on LSTM is trained and used by combining with sound source data and voice data.

For example, combining the front-end information processing technology and the back-end voice recognition technology, that is, acquiring the location parameter by of the sound source by combining the microwave radar technology, combining the voice data and location data (such as the location parameter of the sound source), and obtaining the far-field acoustic model by training it through LSTM algorithm suitable for long audio data and audio data context. Various surrounding environments are automatically recognized through microwave radar technology, and a deep learning algorithm is used to improve the accuracy of far-field voice recognition.

For example: referring to an example shown in FIG. 8, the training an LSTM acoustic model may include: collecting the aforementioned historical data (historical record data of sound source and voice); data preprocessing is a preprocessing, such as missing values, standardization and noise reduction, on the data; loading data into the model through an input layer of the LSTM model; intermediate processing layer of the LSTM model; text output layer outputs text data converted from the voice data to obtain a far-field acoustic model based on LSTM.

Therefore, by pre-collecting voice data and its sound source data and preprocessing it using the LSTM model, the far-field recognition model based on LSTM is obtained, which can be used to facilitate the far-field voice recognition of the second voice data using the far-field voice recognition model, and a recognition rate is high and a recognition effect is good.

Since the processing and functions implemented by the device in this embodiment basically correspond to the embodiments, principles, and examples of the methods shown in FIGS. 1 to 5, if the description of this embodiment is not exhaustive, please refer to the relevant description in the foregoing embodiment, which will not be repeated here.

After a large number of experimental verifications, according to the technical solution of this application, the sound source is located by using a microwave radar technology, the collection state of the microphone array is adjusted according to a sound source location, and the far-field voice recognition model trained based on an LSTM deep learning algorithm to far-field is further used to perform recognition on the voice data, ensuring a high recognition rate to meet the needs of use in complex environments.

According to an embodiment of the present application, an air conditioner corresponding to the voice recognition apparatus is also provided. The air conditioner may include: the voice recognition apparatus described above.

Considering that in a traditional far-field voice recognition technology, far-field distance pickup may be well achieved by mainly using microphone arrays and sound source localization, thus solving the effects of noise, reverberation, and echo, but for the problem of human voice detection and sentence segmentation in complex environments, the treatment effect is poor. For example, a general acoustic model can merely perform noise reduction and recognition processing for voice data, so that the accuracy of the model is not sufficient in a complex environment.

For example, in microphone array technology at the front-end, the voice recognition effect may be improved by increasing the number of microphones, but due to limitations of the price and the size of the product, the number of microphones and the distance between microphones are limited and the function and effect of each microphone is the same, so that noise in multiple directions may be received, thus reducing the accuracy of voice recognition. Therefore, the technology has a lower cost performance with a smaller range of directions to be distinguished.

For example, the existing acoustic model is mainly used to process some near-field short audio data, and can only process voice audio data. It cannot perceive and acquire the position parameters (distance and direction) of the sound source, so it can only adapt to the voice recognition in a specific environment. Moreover, the existing acoustic model belongs to the back-end voice recognition processing technology, which is not closely combined with the front-end signal processing device or algorithms.

In an alternative implementation, the proposed scheme solves the problem of far-field speech recognition in complex environments based on microwave radar positioning technology.

A civil microwave radar and its sensor is a new high-tech industry, which has been widely used in speed measurement, vehicle flow detection, object level meter and other aspects. LSTM is a kind of time recursive neural network system, which can be used to process and predict important events with relatively long time interval and delay in a time sequence.

Specifically, in the solution of the present application, combining front-end information processing technology and back-end voice recognition technology, that is, acquiring a location parameter of the sound source by combining the microwave radar technology, combining the voice data and the location data (such as the location parameter of the sound source), and obtaining the far-field acoustic model by training it through the LSTM algorithm suitable for long audio data and audio data context.

The long audio, relative to short audio, refers to audio of a longer time. Most of the current technologies are suitable for short audio processing. The solution of the present application can realize long audio processing, so that more information can be extracted.

In an optional example, in a far-field environment, a combination of cloud (such as, cloud processing platform) and terminal (such as, a device processing side or a processing platform at a device side) is adopted. On the device processing side, first, the sound source direction of the wake-up word is roughly identified by using the microphone array, then, the distance and direction of the sound source is calculated accurately in real time by using a microwave radar technology, and then the state of the microphone array is controlled in real time by using an edge computing technology. On the cloud processing side, a far-field acoustic model based on LSTM is trained and used by combining with sound source data and voice data.

Optionally, roughly identifying a direction of a sound source for a wake-up word voice using a microphone array may include: the voice recognition system needs to wake up a device through the voice wake-up word (such as: a certain air conditioner). In the solution of the present application, an approximate direction of the voice source for the wake-up word can be obtained through the microphone array technology in advance.

Optionally, the distance and direction of the sound source is accurately calculated in real time using microwave radar technology, may include: microwave radar sends a microwave signal through a sending device, and the microwave signal will be reflected when it encounters an object. By receiving the reflected microwave signal by a receiving device, data such as the position, size, and shape of the object in an environment can be obtained. In the solution of the present application, this technology can be used to obtain location data of the sound source (the person making a sound).

Optionally, the state of the microphone array is controlled in real time by using the edge computing technology, includes: there are multiple microphone devices in the microphone array of the present application, and the state of the microphone is adjusted by a front-end device on the basis of acquiring the approximate location and direction of the sound source through the wake-up word. For example: the microphone array has an effect of 4 microphones in different directions, and it is obtained that the sound source is in a straight-ahead position. At this time, a reception effect (an ability to receive voice signals) of the microphone at the direction may be enhanced, and a reception effect of the microphone at other directions may be suppressed, thereby removing noise in other directions.

For example: enhancing the reception effect of the microphone at the direction (the ability to receive voice signals), and suppressing the reception effect of the microphone at other directions, may mainly include: turning on and turning off the microphones in different directions in the microphone array, and filtering voice received by the microphones. For example: by controlling a switch and filtering the microphone in a certain direction, so that a small amount of voice can be received in the direction.

It can be seen that, in the solution of the present application, far-field voice recognition is a technical difficulty. Various surrounding environments are automatically recognized through microwave radar technology, and a deep learning algorithm is used to improve the accuracy of far-field voice recognition.

In an optional specific implementation manner, the specific implementation process of the solution of the present application can be exemplarily described in conjunction with the examples shown in FIG. 7 and FIG. 8.

In an optional specific example, the solution of the present application mainly includes related technologies such as microwave radar locating, deep learning, big data processing, edge computing, cloud computing and so on, and is divided into two functional modules: device-side processing platform and cloud processing platform.

Specifically, in a system shown in FIG. 7, the microphone array receives voice data and determines an approximate location of the sound source of the wake-up word. The microwave radar acquires a location parameter (direction and distance data) of the sound source, namely, acquires the sound source data. Adjusting a state of the microphone array refers to enhance or suppress a microphone in a corresponding direction according to the sound source location. The far-field acoustic model based on LSTM converts voice data into corresponding text data through the acoustic model trained by sound source data and voice data. The sound source data may include a location parameter (direction and distance data) of the sound source; voice data may be the voice data collected by microphone in the microphone array of which the state has been adjusted; text data can be obtained by converting voice data into text data through a trained acoustic model.

Referring to the example shown in FIG. 7, the implementation principle of the solution of the present application may include:

On the one hand, on a device-side processing platform, first, a sound source of the wake-up word is located approximately by using a microphone array (e.g., the location of the sound source of the wake-up word is determined according to the direction of sound waves through the microphone array); then, the microwave radar module is used to accurately locate the sound source, and collect the data of distance and direction (namely, the distance and direction of the sound source); next, microphone(s) at the corresponding position in the microphone array module is turned on and off according to the data; finally, audio data of far-field is collected.

On the other hand, on a cloud processing platform, first, the LSTM acoustic model is trained using manually collected and labeled sound sources and audio databases to obtain a far-field voice recognition model; then, through real-time collection of voice data, real-time far-field voice recognition is performed on the above model; finally, high-accuracy voice and text data is obtained in a complex environment.

The main purpose is to label location data of the sound source for the purpose of marking during training.

In an optional specific example, in the solution of the present application, in complex scenarios, far-field voice recognition can be performed accurately and efficiently based on microwave radar technology. Referring to the example shown in FIG. 8, the specific process of far-field voice recognition based on microwave radar in the solution of the present application may include:

Step 1, training the LSTM acoustic model may specifically include:

Step 11, collecting the historical data mentioned above (the recorded historical data of the sound source and voice).

Step 12, data preprocessing: the process of missing values, standardization, noise reduction and other preprocessing on the data.

For example, process of missing values is to fill in the data items that may be missing with an overall mean or other methods. Standardization is to homogenize different data through data normalization or the same measurement, such as making audio data and position data into the same type of data.

Step 13, loading the data into a model through an input layer of an LSTM model.

Step 14, intermediate processing layer of LSTM model.

The intermediate processing layer is a processing process of a neural network, which is a fixed operation in the LSTM algorithm. For example, the intermediate processing layer updates states of cells and weights of connections between cells in the network through input, forget, and output methods.

Step 15, text output layer, which outputs text data converted from the voice data to obtain a far-field acoustic model based on LSTM.

Step 2, real-time voice: which is used to monitor voice of an air-conditioner in real-time.

Step 3, collecting voice data and sound source data.

Step 4, preprocessing data, which can be the same as the data preprocessing method of training the LSTM acoustic model in step 1.

Step 5, LSTM-based far-field acoustic model: which recognize voice using the far-field LSTM acoustic model trained by the method of training the LSTM acoustic model in step 1.

Step 6, voice text data: which is a corresponding text data obtained according to a voice recognition result of the model.

It can be seen that in a process of using voice device in complex environments, accurate, efficient, and real-time far-field recognition technology is required to solve the impact of noise, reverberation, and echo, and to improve user experience. There is an urgent need for a far-field recognition system that is intelligent, efficient, highly accurate and highly reliable. However, at present, far-field recognition on the market is mainly in the form of a single microphone array and acoustic model for simple recognition. The recognition accuracy in complex scenes is not high. For the time being, there is no high accuracy and reliability method for far-field voice identification. The solution of the present application, based on microwave radar technology, combines with the LSTM deep learning algorithm model, uses sound sources and voice data to train a far-field voice recognition model, and accurately and efficiently converts voice data into text data, providing users with far-field voice system with high recognition rate.

For example, after the voice is converted into text data, by extracting and recognizing the text data, the corresponding device can be controlled. This is a necessary step for a voice recognition system.

Since the processing and functions implemented by the air conditioner in the embodiment basically correspond to the embodiments, principles, and examples of the methods shown in FIG. 6. if the description of this embodiment is not exhaustive, please refer to the relevant description in the foregoing embodiment, which will not be repeated here.

After a large number of experimental verifications, in the technical solution of this application, voice data is converted into text data accurately and efficiently by using a far-field voice recognition model trained by a sound source and voice data based on a microwave radar technology and combined with an LSTM deep learning algorithm model, which can improve far-field voice recognition effect.

According to an embodiment of the present application, a storage medium corresponding to the voice recognition method is also provided. The storage medium may include: a plurality of instructions stored in the storage medium. The plurality of instructions is loaded by a processor to execute the voice recognition method mentioned above.

Since the processing and functions implemented by the storage medium in this embodiment basically correspond to the embodiments, principles, and examples of the methods shown in FIGS. 1 to 5, if the description of this embodiment is not exhaustive, please refer to the relevant description in the foregoing embodiment, which will not be repeated here.

After a large number of experimental verifications, in the technical solution of this application, combining front-end information processing technology with back-end voice recognition technology, namely: acquiring the location parameter of the sound source by combining microwave radar technology, combining the audio data and the location data (such as the location parameter of the sound source), and obtaining the far-field acoustic model by training it through LSTM algorithm suitable for long audio data and audio data context. This solution can shorten the response time and improve the noise reduction effect.

According to an embodiment of the present application, an air conditioner corresponding to the voice recognition method is also provided. The air conditioner may include: a processor for executing a plurality of instructions; a storage medium for storing the plurality of instructions. The plurality of instructions are stored in the storage medium and are loaded by the processor to execute the voice recognition method described above.

Since the processing and functions implemented by the air conditioner in this embodiment basically correspond to the embodiments, principles, and examples of the methods shown in FIGS. 1 to 5, if the description of this embodiment is not exhaustive, please refer to the relevant description in the foregoing embodiment, which will not be repeated here.

After a large number of experimental verifications, in the solution of the present application, on the basis of using a microphone array to roughly identify the direction of the sound source of the wake-up word voice, the distance and direction of the sound source are accurately calculated in real time by using microwave radar technology, and then a state of microphone array is controlled in real time by using edge computing technology, and using a far-field acoustic model based on LSTM is trained and used by combining with the sound source data and voice data, the efficiency of far-field recognition and noise reduction can be improved, and the response time can be shorten.

In summary, it is easy for those skilled in the art to understand that the above-mentioned advantageous methods may be freely combined and superimposed on the premise of no conflict.

The above are only examples of the present application, and are not configured to limit the present application. For those skilled in the art, there are various modifications and changes. Any modification, equivalent replacement, improvement and so on made within the spirit and principle of the present application should be included within the scope of the claims of the present application.

What is claimed is:

1. A voice recognition method, comprising:
    acquiring first voice data;
    adjusting, according to the first voice data, a collection state of second voice data to obtain an adjusted collection state, and acquiring the second voice data based on the adjusted collection state; and
    performing far-field voice recognition on the second voice data using a preset far-field voice recognition model so as to obtain semantic information corresponding to the second voice data,
    wherein the adjusting, according to the first voice data, a collection state of second voice data comprises: after determining location information of a sound source sending the first voice data, performing at least one of the following:
    enhancing an intensity of the voice collection device that collects the first voice data to collect the second voice data on the location information; and
    suppressing an intensity of the voice collection device that collects the first voice data to collect the second voice data at locations except the location information,
    wherein the determining location information of a sound source sending the first voice data comprises:
    determining a direction of the sound source sending the first voice data using the voice collection device; and
    locating the sound source based on the direction by using a locating device to obtain the location information of the sound source,
    wherein the locating device comprises: a microwave radar module; and the location information comprises: a distance and a direction.

2. The method of claim 1, wherein the first voice data comprises a voice wake-up word, the voice wake-up word is voice data for waking up a voice device; and
    the second voice data comprises a voice command, the voice command is voice data for controlling the voice device.

3. The method of claim 1, wherein an operation of acquiring first voice data, an operation of adjusting, according to the first voice data, a collection state of second voice data to obtain an adjusted collection state, and an operation of acquiring the second voice data based on the adjusted collection state are executed at a local side of a voice device; and an operation of performing far-field voice recognition on the second voice data using the preset far-field voice recognition model is executed by the voice device at the local side in response to reception of feedback information obtained by an operation of cloud.

4. The method of claim 1, wherein the acquiring first voice data comprises:
acquiring the first voice data collected by a voice collection device;
wherein the acquiring the second voice data comprises:
acquiring the second voice data collected by a voice collection device after the collection state is adjusted,
wherein the voice collection device comprises: a microphone array provided with more than one microphone for collecting voice data in more than one direction.

5. The method of claim 1, wherein the enhancing an intensity of the voice collection device that collects the first voice data to collect the second voice data on the location information comprises at least one of the following:
in a case that the voice collection device comprises a microphone array, turning on a microphone, on the location information, in the microphone array; and
in a case that the voice collection device comprises the microphone array, increasing the number of microphones turned on, on the location information, in the microphone array.

6. The method of claim 1, wherein the suppressing an intensity of the voice collection device that collects the first voice data to collect the second voice data at locations except the location information comprises at least one of the following:
turning off microphones at locations, except the location information, in the microphone array; and
reducing the number of the microphones turned on, at locations, except the location information, in the microphone array.

7. The method of claim 1, wherein the performing far-field voice recognition on the second voice data using the preset far-field voice recognition model comprises:
preprocessing the second voice data to obtain voice information; and
performing, using the preset far-field voice recognition model, far-field voice recognition on the voice information obtained by preprocessing;
wherein the far-field voice recognition model comprises: a far-field acoustic model obtained by deep learning training based on a long short-term memory network (LSTM) algorithm.

8. The method of claim 1, further comprising:
collecting voice data and sound source data of the voice data; and
performing training, after the voice data and the sound source data is preprocessed, with an LSTM model to obtain a far-field voice recognition model based on LSTM.

9. A voice recognition apparatus, comprising:
a processor for executing a plurality of instructions;
a non-transitory storage medium for storing the plurality of instructions,
wherein the plurality of instructions cause the processor to implement following operations:
acquiring first voice data;
adjusting, according to the first voice data, a collection state of second voice data to obtain an adjusted collection state, and acquire the second voice data based on the adjusted collection state; and
performing far-field voice recognition on the second voice data using a preset far-field voice recognition model so as to obtain semantic information corresponding to the second voice data,
wherein the adjusting, according to the first voice data, a collection state of second voice data comprises: after determining location information of a sound source sending the first voice data, performing at least one of the following:
enhancing an intensity of the voice collection device that collects the first voice data to collect the second voice data on the location information; and
suppressing an intensity of the voice collection device that collects the first voice data to collect the second voice data at locations except the location information,
wherein the determining location information of a sound source sending the first voice data comprises:
determining a direction of the sound source sending the first voice data using the voice collection device; and
locating the sound source based on the direction by using a locating device to obtain the location information of the sound source,
wherein the locating device comprises: a microwave radar module; and the location information comprises: a distance and a direction.

10. The apparatus of claim 9, wherein the first voice data comprises: a voice wake-up word; the voice wake-up word is voice data for waking up a voice device; and
the second voice data comprises a voice command, the voice command is voice data for controlling the voice device.

11. The apparatus of claim 9, wherein an operation of acquiring first voice data, an operation of adjusting, according to the first voice data, a collection state of second voice data to obtain an adjusted collection state, and an operation of acquiring the second voice data based on the adjusted collection state are executed at a local side of a voice device; and
an operation of performing far-field voice recognition on the second voice data using the preset far-field voice recognition model is executed by the voice device at the local side in response to reception of feedback information obtained by an operation of cloud.

12. The apparatus of claim 9, wherein the processor is configured to:
acquire the first voice data collected by a voice collection device; and
acquire the second voice data collected by a voice collection device after the collection state is adjusted;
wherein the voice collection device comprises: a microphone array provided with more than one microphone for collecting voice data in more than one direction.

13. The apparatus of claim 9, wherein the processor is configured to perform at least one of the following:
in a case that the voice collection device comprises a microphone array, turning on a microphone, on the location information, in the microphone array; and
in a case that the voice collection device comprises the microphone array, increasing the number of microphones turned on, on the location information, in the microphone array.

14. The apparatus of claim 9, wherein the processor is configured to perform at least one of the following:
turning off microphones at locations, except the location information, in the microphone array; and reducing the number of the microphones turned on, at locations, except the location information, in the microphone array.

15. The apparatus of claim 9, wherein the processor is further configured to:
collect voice data and sound source data of the voice data; and
perform training, after the voice data and the sound source data is preprocessed, with an LSTM model to obtain a far-field voice recognition model based on LSTM.

16. An air conditioner, comprising the voice recognition apparatus of claim 9.

* * * * *